(12) United States Patent
Ueda

(10) Patent No.: US 7,340,683 B2
(45) Date of Patent: Mar. 4, 2008

(54) PROGRAMMING TOOL

(75) Inventor: Jun Ueda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 645 days.

(21) Appl. No.: 10/451,993

(22) PCT Filed: Mar. 29, 2001

(86) PCT No.: PCT/JP01/02670

§ 371 (c)(1),
(2), (4) Date: Jun. 27, 2003

(87) PCT Pub. No.: WO02/079886

PCT Pub. Date: Oct. 10, 2002

(65) Prior Publication Data

US 2005/0102651 A1    May 12, 2005

(51) Int. Cl.
*G06F 3/048* (2006.01)
(52) U.S. Cl. .................. 715/763; 715/967; 715/810; 716/11; 717/109
(58) Field of Classification Search .............. None
See application file for complete search history.

(56) References Cited

U.S. PATENT DOCUMENTS

| | | | |
|---|---|---|---|
| 4,710,863 A | | 12/1987 | Kaufmann et al. |
| 5,034,899 A | | 7/1991 | Schult |
| 5,168,441 A | * | 12/1992 | Onarheim et al. ............ 700/17 |
| 5,301,301 A | * | 4/1994 | Kodosky et al. .............. 716/11 |
| 5,408,603 A | * | 4/1995 | Van de Lavoir et al. ... 715/763 |
| 5,481,740 A | * | 1/1996 | Kodosky ..................... 715/839 |
| 5,487,144 A | * | 1/1996 | Takahashi et al. ........... 715/835 |
| 5,506,952 A | * | 4/1996 | Choy et al. .................. 715/763 |
| 5,754,179 A | * | 5/1998 | Hocker et al. ............... 715/835 |
| 5,781,192 A | | 7/1998 | Kodimer |
| 5,852,440 A | * | 12/1998 | Grossman et al. ........... 715/811 |
| 5,867,400 A | * | 2/1999 | El-Ghoroury et al. .......... 716/1 |
| 6,035,106 A | * | 3/2000 | Carruthers et al. ............. 703/1 |
| 6,173,208 B1 | * | 1/2001 | Park et al. ..................... 700/83 |
| 6,191,798 B1 | * | 2/2001 | Handelman et al. ......... 345/473 |
| 6,370,491 B1 | * | 4/2002 | Malthe-Sorenssen et al. .. 703/2 |

(Continued)

FOREIGN PATENT DOCUMENTS

DE    693 09 315    10/1997

(Continued)

OTHER PUBLICATIONS

Author: Vision Corporation, Title: Visio 2000 Standard Edition, User Guide, Date: 1999, Publisher: Visio Corporation, Pertinent pp. 14.*

(Continued)

*Primary Examiner*—Mark Zimmerman
*Assistant Examiner*—David Chu
(74) *Attorney, Agent, or Firm*—Sughrue Mion, PLLC

(57) ABSTRACT

A programming tool has selection means for selecting a plurality of function blocks displayed in a library format, storage means for storing the function blocks selected through the selection means in the order as they are selected, and drawing means, as a plurality of function blocks selected through the selection means are confirmed, for drawing and display the confirmed function blocks in the order as they are selected.

10 Claims, 16 Drawing Sheets

U.S. PATENT DOCUMENTS

| | | | |
|---|---|---|---|
| 6,434,737 B1 * | 8/2002 | Nishi et al. | 717/105 |
| 6,708,290 B2 * | 3/2004 | Swoboda et al. | 714/30 |
| 6,738,388 B1 * | 5/2004 | Stevenson et al. | 370/465 |
| 6,931,288 B1 * | 8/2005 | Lee et al. | 700/86 |
| 6,968,472 B2 * | 11/2005 | Fernald | 713/400 |
| 7,093,192 B2 * | 8/2006 | Mullen et al. | 715/502 |
| 2002/0054149 A1 * | 5/2002 | Genise et al. | 345/810 |
| 2002/0124230 A1 * | 9/2002 | Cai et al. | 716/6 |
| 2003/0107595 A1 * | 6/2003 | Ciolfi | 345/762 |
| 2005/0010307 A1 * | 1/2005 | Dove et al. | 700/18 |

FOREIGN PATENT DOCUMENTS

| | | |
|---|---|---|
| JP | 04-100105 A | 4/1992 |
| JP | 05-233240 A | 9/1993 |
| JP | 06-337909 A | 12/1994 |
| JP | 07-093007 A | 4/1995 |
| JP | 07-104903 A | 4/1995 |
| JP | 8-106380 | 4/1996 |
| JP | 08-241185 | 9/1996 |
| JP | 09-044210 A | 2/1997 |
| JP | 9-223028 | 8/1997 |
| JP | 9-230913 | 9/1997 |
| JP | 10-301607 | 11/1998 |
| JP | 11-095819 A | 4/1999 |
| JP | 11-161305 | 6/1999 |
| JP | 200-276508 A | 10/2000 |
| JP | 2001-75790 | 3/2001 |
| WO | WO 00/07081 | 2/2000 |

OTHER PUBLICATIONS

Office Action mailed from Japanese Patent Office dated Jun. 5, 2007 in corresponding Japanese Patent Application No. 2002-577655.

* cited by examiner

FIG.4

| FB NAME | SIZE(mm) (LONGITUDINAL, LATERAL) | NUMBER OF INPUTS | NUMBER OF OUTPUTS | INPUT PIN 1 DATA TYPE | INPUT PIN 2 DATA TYPE | INPUT PIN 3 DATA TYPE | OUTPUT PIN 1 DATA TYPE | OUTPUT PIN 2 DATA TYPE | OUTPUT PIN 3 DATA TYPE |
|---|---|---|---|---|---|---|---|---|---|
| A | 20,25 | 1 | 2 | DATE AND TIME | NONE | NONE | CHARACTER STRING | REAL NUMBER | NONE |
| B | 20,25 | 1 | 1 | CHARACTER STRING | NONE | NONE | INTEGER | NONE | NONE |
| C | 24,20 | 2 | 1 | REAL NUMBER | REAL NUMBER | NONE | DATE AND TIME | NONE | NONE |
| D | 15,25 | 3 | 1 | REAL NUMBER | REAL NUMBER | INTEGER | REAL NUMBER | NONE | NONE |
| E | 20,25 | 2 | 2 | CHARACTER STRING | INTEGER | NONE | REAL NUMBER | REAL NUMBER | NONE |
| F | 32,25 | 2 | 3 | INTEGER | DATE AND TIME | NONE | REAL NUMBER | REAL NUMBER | INTEGER |

FIG.7

|  | COLUMN 1 | COLUMN 2 | COLUMN 3 | COLUMN 4 |
|---|---|---|---|---|
| | T101 | T103 | T105 | |
| ROW 1 | "O"<br>"(10,0):(35,0):(10,20):(35,20)"<br>"(0,10):(10,10)"<br>" "<br>" "<br>"(35,10):(45,10),1" | "(45,10):(45,10.7)"<br>" "<br>" " | "F"<br>"(55,0):(80,0):(55,10.7):(80,32)"<br>"(45,10.7):(55,10.7)"<br>"(45,21.3):(55,21.3)"<br>" "<br>"(80,8):(90,8)"<br>"(80,16):(90,16)"<br>"(80,24):(90,24)" | |
| | T102 | T104 | | |
| ROW 2 | "C"<br>"(10,35):(30,35):(10,59):(30,59)"<br>"(0,43):(10,43)"<br>"(0,51):(10,51)"<br>" "<br>"(30,47):(45,47),1" | "(45,47):(45,21.3)"<br>" "<br>" " | | |
| ROW 3 | | | | |

OUTPUT PIN 1 CONNECTION COORDINATES, CONNECTION FLAG
OUTPUT PIN 2 CONNECTION COORDINATES, CONNECTION FLAG
OUTPUT PIN 3 CONNECTION COORDINATES, CONNECTION FLAG

BLOCK NAME
BLOCK COORDINATES
INPUT PIN 1 COORDINATES
INPUT PIN 2 COORDINATES
INPUT PIN 3 COORDINATES
OUTPUT PIN 1 COORDINATES
OUTPUT PIN 2 COORDINATES
OUTPUT PIN 3 COORDINATES

5a

| FB NAME | NEXT CANDIDATE FB | BIT STRING REPRESENTING FUNCTION BLOCKS AS NEXT CANDIDATES |
|---|---|---|
| A | B,C,D | 011100 |
| B | D,E,F | 000111 |
| C | A,F | 100001 |
| D | C,D | 001100 |
| E | C,D | 001100 |
| F | C,D,E,F | 001111 |

| | OBJECT | COORDINATES |
|---|---|---|
| 1 | FB A | (10,30) ; (35,30) ; (10,50) ; (35,50)<br>(0,40) ; (10,40)<br>(35,36.7) ; (50,36.7)<br>(35,43.3) ; (50,43.3) |
| 2 | LINE (L1) | (50,25) ; (50,36.7) |
| 3 | FB B | (60,15) ; (85,15) ; (60,35) ; (85,35)<br>(50,25) ; (60,25)<br>(85,25) ; (90,25) |
| 4 | LINE (L2) | (45,43.3) ; (45,63) |
| 5 | FB C | (70,55) ; (90,55) ; (70,79) ; (90,79)<br>(45,63) ; (70,63)<br>(60,71) ; (70,71)<br>(90,67) ; (100,67) |
| 6 | FB F | (110,0) ; (135,0) ; (110,32) ; (135,32)<br>(100,10.7) ; (110,10.7)<br>(100,21.3) ; (110,21.3)<br>(135,8) ; (145,8)<br>(135,16) ; (145,16)<br>(135,24) ; (145,24) |
| 7 | LINE (L3) | (145,8) ; (145,8) |
| 8 | LINE (L4) | (145,16) ; (145,16) |
| 9 | FB C | (155,0) ; (175,0) ; (155,24) ; (175,24)<br>(145,8) ; (155,8)<br>(145,16) ; (155,16)<br>(175,12) ; (185,12) |

~5c

~x_max

"F"
"(10,0);(35,0);(10,32);(35,32)"
"(0,10.7);(10,10.7)"
"(0,21.3);(10,21.3)"
" "
"(35,8);(45,8)"
"(35,16);(45,16)"
"(35,24);(45,24)"

"(45,8);(45,8)"
"(45,16);
(45,16)"
" "

"C"
"(55,0);(75,0);(55,24);
(75,24)"
"(45,8);(55,8)"
"(45,16);(55,16)"
" "
"(75,12);(85,12)"
" "

5a

PROGRAMMING TOOL

TECHNICAL FIELD

The invention relates to a programming tool for programming with a function block diagram (hereinafter referred to as FBD).

BACKGROUND OF THE INVENTION

FIG. 16 is a drawing to show configuration and a programming operation of a programming tool with an FBD according to a related art. The operation of preparing an FBD of a programmable controller 109 connected through an information transmission section 106 by a programming tool 110 will be discussed.

Generally, the programming tool 110 with an FBD is made up of an FB library section 102 storing function blocks (FBs) 120, which the user will select, and an FBD editor section 101 for dragging and dropping the selected FBs 120 and connecting them, as shown in FIG. 16.

The FB 120 is a function block having an algorithm and data for implementing a certain function and having a hidden internal structure, and has input pins 121 as an input interface and output pins 122 as an output interface.

In the programming tool with the FBD in the related art, one FB is selected out of the FB library section 102 and the selected FB is placed at any desired position of the FBD editor section 1 by dragging and dropping with a mouse 107b.

After placement, to connect between the input pin 121 of the FB 120 and the output pin 122 of another FB 120 placed preceding that FB 120 or the output pin 122 of the FB 120 and the input pin 121 of another FB 120 placed preceding that FB 120, one pin is selected by click operation of the mouse 107b and further the other pin to be connected is selected by click operation of the mouse 107b, etc.

This operation is repeated, thereby representing a processing flow and preparing a program.

In the programming tool in the related art, the operation of selecting an FB 120, placing the selected FB in the FBD editor section 101 by drag-and-drop operation, and connecting the FB 120 to another FB 120 placed preceding that FB 120 is repeated for preparing a program, as described above. Thus, as many drag-and-drop operations as the number of FBs in the program and the connection operation to each FB are required and there is a problem of very burdensome operation.

DISCLOSURE OF THE INVENTION

The invention is intended for solving the problems as described above and it is an object of the invention to provide a programming tool for making it possible to prepare a program with an FBD by a simple operation.

To the end, according to a first aspect of the invention, there is provided a programming tool comprising selection means for selecting a plurality of function blocks displayed in a library format, storage means for storing the function blocks selected through the selection means in the order as they are selected, and drawing means, as a plurality of function blocks selected through the selection means are confirmed, for drawing and display the confirmed function blocks in the order as they are selected.

The programming tool comprises preview means for producing preview display of the selected function blocks at the function block selection time.

When the preview display is produced, a virtual column for displaying the function blocks is provided, the maximum value of the lateral sizes of the function blocks displayed in the column is used to calculate the lengths of output pins of the function blocks, and the function blocks in the column are aligned to the left.

The function blocks are selected and confirmed by mouse click or dragging and dropping of the function blocks displayed in the library format.

When a function block is selected, the function blocks as next candidates to the selected function block are narrowed down and the function blocks as the next candidates are displayed in a different manner.

Each function block is previously assigned the data types of an input pin and an output pin of the function block and the selected function blocks are connected based on the data types.

When a function block is selected, the function block is connected in parallel as predetermined key operation is performed in combination.

BRIEF DESCRIPTION OF THE DRAWINGS

In the accompanying drawings,

FIG. 4 is a drawing to show a state in which function block information is stored in a function block information storage section in a storage section of the programming tool according to the invention.

FIG. 7 is a drawing to show a state in which drawing information is stored in a preview drawing information storage section in the storage section of the programming tool according to the invention.

FIG. 15 shows an example of the preview drawing information storage section and an FBD editor drawing information storage section in the editor drawing processing of the programming tool according to the invention.

BEST MODE FOR CARRYING OUT THE INVENTION

Figure 1:
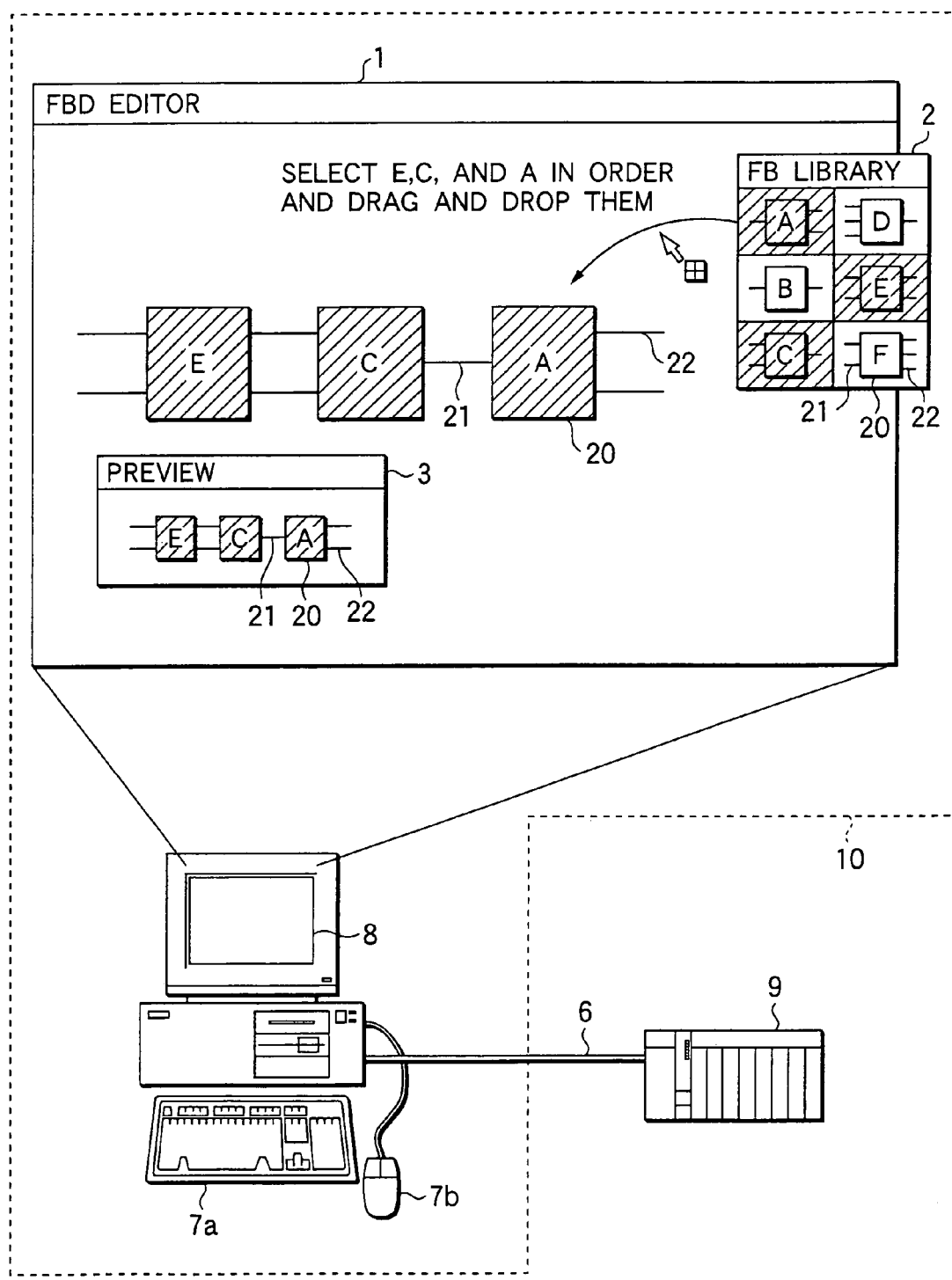
FIG. 1 is a system configuration drawing of a programming tool according to the invention.

FIG. 1 is a drawing to show the configuration and programming operation of a programming tool 10 of the invention.

Figure 2:
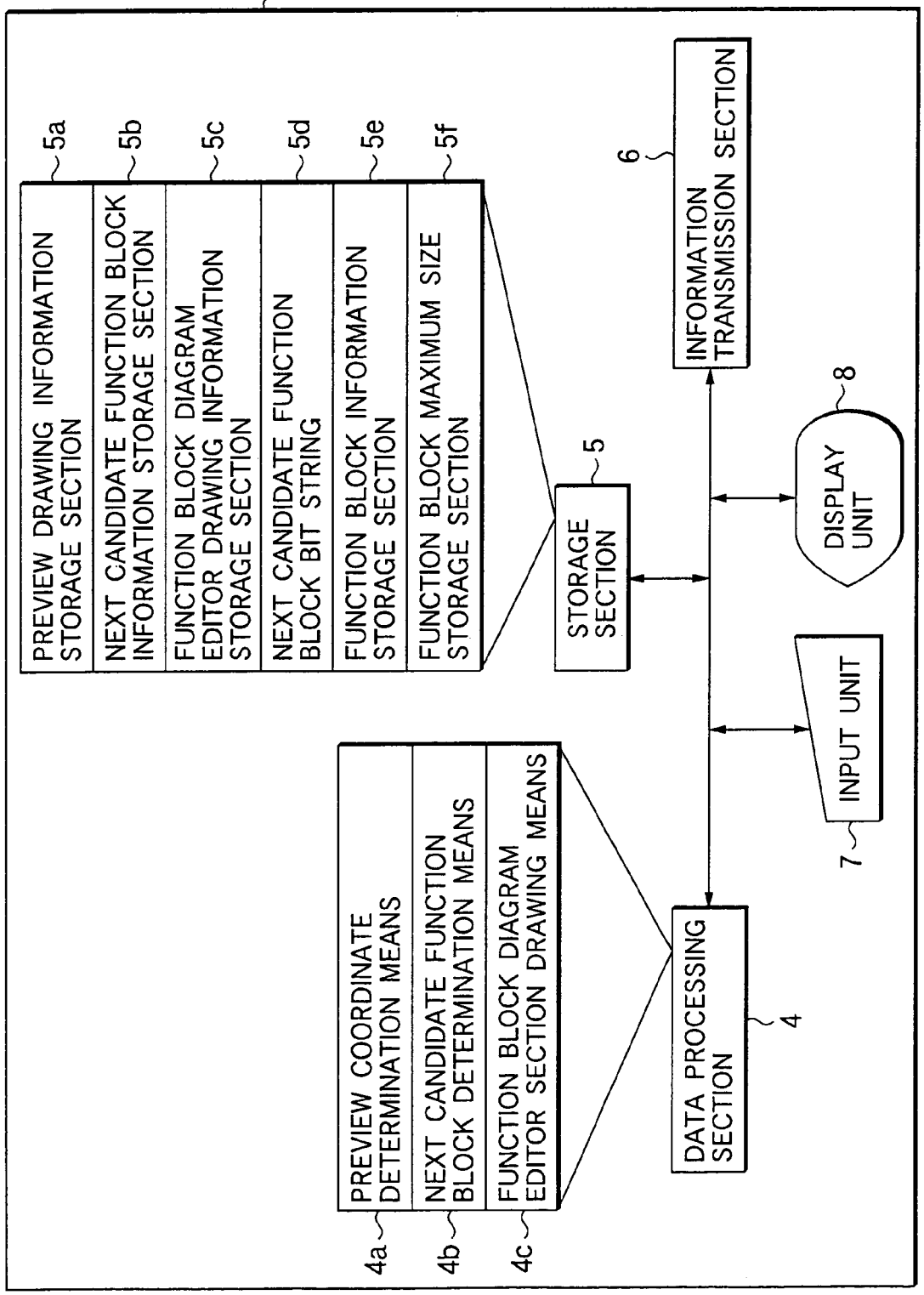
FIG. 2 is a circuit block diagram of the programming tool according to the invention.

FIG. 2 is a circuit block diagram of the programming tool 10 according to the invention. In the description of the embodiment, a case where the programming tool 10 programs a programmable controller 9 is taken as an example.

As shown in FIGS. 1 and 2, the programming tool 10 of the invention has as components, a data processing section 4 for processing data in the programming tool, a storage section 5 used for calculation of data processing, an information transmission section 6 for transferring data to and from the programmable controller 9, input units 7 such as a keyboard 7a, a mouse 7b, etc., and a display 8 such as a CRT (Cathode Ray Tube), and has on the display 8, an FBD editor section 1 for dragging and dropping and connecting selected FBs 20, an FB library section 2 storing FBs 20, which the user will select, and a preview display section 3 for displaying a drawing image when the user drags and drops the FB 20 selected out of the FB library section 2 by click operation of the mouse 7b into the FBD editor section 1. (Hereinafter, the user's operation of selecting an FB 20 out of the FB library section 2 by click operation of the mouse 7b will be defined as FB selection operation.)

The FB 20 is a function block having an algorithm and data for implementing a certain function and having a hidden internal structure, and has input pins 21 as an input interface and output pins 22 as an output interface.

In the data processing section 4, numeral 4a denotes preview coordinate determination means for determining the coordinates to draw the FB 20 selected by FB selection operation on the preview display section 3, numeral 4b denotes next candidate FB determination means for referencing information for each FB 20 in a next candidate FB information storage section 5b, determining a bit string representing the FB 20 as the next candidate (called the next candidate FB bit string), and storing the bit string in a next candidate FB bit string storage section 5d, and numeral 4c denotes FBD editor section drawing means for drawing in the FBD editor section 1 based on FB and connection coordinate information stored in an FBD editor drawing information storage section 5c when the user drags and drops the selected FB 20 into the FBD editor section 1.

In the storage section 5, numeral 5a denotes a preview drawing information storage section for storing the coordinates to draw the FB 20 selected by FB selection operation on the preview display section 3, numeral 5b denotes the next candidate FB information storage section for storing information of the FB as the next selection candidate (hereinafter, called the next candidate FB) previously determined for each FB 20 by the manufacturer providing the programming tool, numeral 5c denotes the FBD editor drawing information storage section for storing FB and connection coordinates drawn in the FBD editor section 1 when the user selects one or more FBs 20 by FB selection operation and drags and drops the selected FB or FBs 20 into the FBD editor section 1, numeral 5d denotes the next-candidate FB bit string storage section for storing the bit string representing the FB 20 as the next selection candidate at one point in time (determined by the next candidate FB determination means 4b based on the next candidate FB information storage section in response to the operation order of the FB selection operation), numeral 5e denotes an FB information storage section for storing attribute information of each FB provided by the manufacturer providing the programming tool (FB name, size, the number of inputs, the number of outputs, input pin data types, and output pin data types), and numeral 5f denotes an FB maximum size storage section for storing the length of the FB with the maximum lateral size in the column to which the selected FB belongs (virtual column of the preview display section 3 described later).

Next, the general operation of the embodiment will be discussed with a flowchart to show the operation of the programming tool in FIG. 3.

At user operation ST1, when the user selects an FB 20 out of the FB library section 2 by click operation of the mouse 7b, at preview coordinate determination processing ST2, the preview coordinate determination means 4a is executed and the coordinates to draw the selected FB 20 on the preview display section 3 are calculated and are stored in the preview drawing information storage section 5a.

Next, at next candidate function block determination processing ST3, the next candidate function block determination means 4b is executed, information for each FB 20 previously stored in the next candidate FB information storage section 5b is referenced, and the bit string representing the FB 20 as the next candidate with respect to the FB 20 selected at the user operation ST1 (next candidate FB bit string) is determined and is stored in the next candidate FB bit string storage section 5d.

Here, the number of bits of the bit string (digit number) is equal to the number of the FBs 20 provided by the manufacturer in the FB library section 2 and the bits are provided in a one-to-one correspondence with the FBs 20.

The bit value "1" means that the corresponding FB is "next candidate FB" and "0" means that the corresponding FB is not "next candidate FB."

For example, it is assumed that the FBs 20 provided by the manufacturer are A, B, C, D, E, and. F, that the bit string becomes like 011100, and that the most significant bit corresponds to A and the least significant bit corresponds to F. B, C, and D are next candidate FBs and A, E, and F are not next candidate FBs.

Then, at preview display section drawing processing ST4, the selected FB 20 is drawn on the preview display section 3 based on the preview drawing information storage section 5a.

Last; at FB library section drawing processing ST5, the FB library section 2 is redrawn in different display modes based on the next candidate FB bit string in the next candidate FB bit string storage section 5d as different background colors are used, etc., so that the difference between the FBs 20 as the next candidates and the FBs not as the next candidates can be seen at a glance.

While the user performs operation of selecting FBs 20 in order, steps ST1 to ST5 are repeated and processing of first FB selection→display of the first FB on the preview display section 3→highlight of FB that can be connected to the first FB in the FB library 2→second FB selection→ . . . is repeated.

The user might want to again make selection of FB 20 from the beginning if the user selects an erroneous FB 20 or selects FBs 20 in an erroneous order, etc., in the selection of FBs 20.

To do this, if the user presses a Delete key at the user operation ST1, the information in the preview drawing information storage section 5a is cleared (deleted) according to preview drawing information clear processing ST6, and the next candidate FB bit string in the next candidate FB bit string storage section 5d is cleared (to all zeros) according to next candidate FB bit string clear processing ST7.

Further, the preview display section 3 is redrawn based on the preview drawing information storage section 5a cleared at ST6 and the FB library section 2 is redrawn based on the next candidate FB bit string in the next candidate FB bit string storage section 5d cleared at ST7, whereby the preview display section 3 and the FB library section 2 are placed in the display in a state in which the user selects no FBs.

If the user checks the preview on the preview display section 3 and then drags and drops the selected FB 20 into the FBD editor section 1 (last selected FB), at FBD editor section drawing processing ST8, the FBD editor section drawing means 4c is executed and the diagram drawn on the preview display section 3 is drawn in the FBD editor section 1.

Further, due to the processing of ST6 and ST7, the preview display section and the FB library section 2 are placed in the display in a state in which the user selects no FBs.

Next, ST1 to ST5 for the user to select FBs 20 out of the FB library section 2 by click operation of the mouse 7b will be discussed in detail.

The preview coordinate determination processing ST2 by the preview coordinate determination means 4a will be discussed with FIGS. 4 to 7.

FIG. 4 is a drawing to show a state in which the attribute information of each FB 20 is stored in the FB information storage section 5e.

For simplicity, the maximum numbers of inputs and outputs are each three in the example. As shown in FIG. 4, the attribute information of each FB 20 has the FB name, size, the number of inputs, the number of outputs, input pin data types, and output pin data types.

The size is the longitudinal and lateral lengths of the FB 20 (in mm units) and the number of inputs and the number of outputs are the numbers of the input pins 21 and the output pins 22 of the FBs 20, respectively.

The input pin 1 data type, the input pin 2 data type, and the input pin 3 data type correspond to the data types of the three input pints 21.

If the number of input pins is less than three, the data type corresponding to non-existent input pint 21 becomes "NONE."

For example, if the number of input pins is one and the data type of the input pin is "INTEGER," the input pin 1 data type, the input pin2 data type, and the input pin 3 data type become "INTEGER," "NONE," and "NONE", respectively.

As for the output pins 22, like the input pints 21, the output pin 1 data type, the output pin 2 data type, and the output pin 3 data type correspond to the data types of the three output pins 22.

The data type of input pin 21, output pin 22 represents the type of data transferred between the input pin 21 and the output pin 22 when the input pin 21 of the FB 20 is connected to the output pin of any other FB 20, and is integer (1, 2, 3, . . . ), real number (1.25, etc.,), character string (ABC, etc.,), date and time (Jan. 22, 2001 17:30:32), or the like.

The data type of input pin 21, output pin 22 is previously defined by the manufacturer providing the programming tool according to the function of FB 20.

If the data types of the input pin 21 and the output pin 22 connected do not equal, data is not transferred correctly and thus connection is possible only between the input pin 21 and the output pin 22 having the equal data type.

Figure 5:
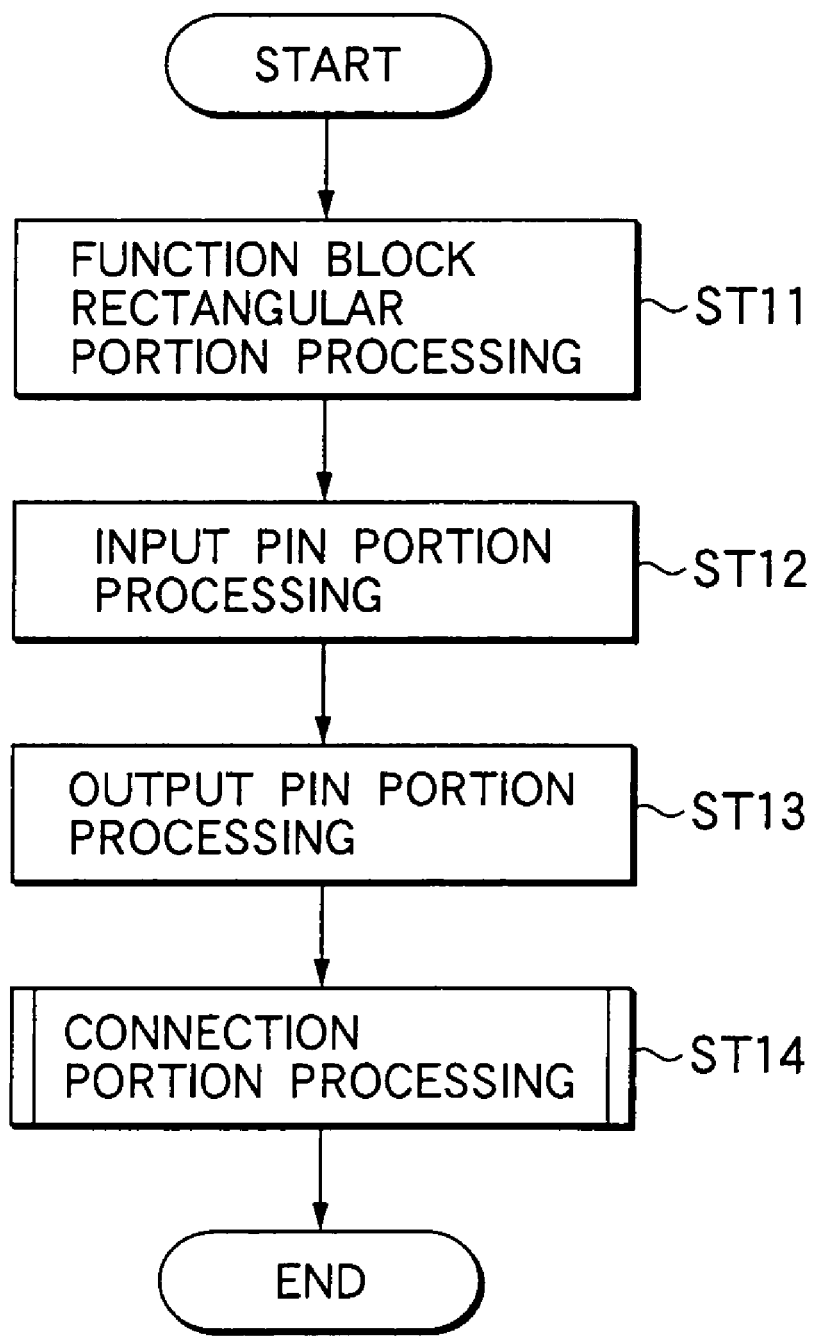
FIG. 5 is a flowchart to show the operation of preview processing of the programming tool according to the invention.

FIG. 5 is a flowchart to represent the operation of the preview coordinate determination processing ST2 by the preview coordinate determination means 4a.

Figure 6:
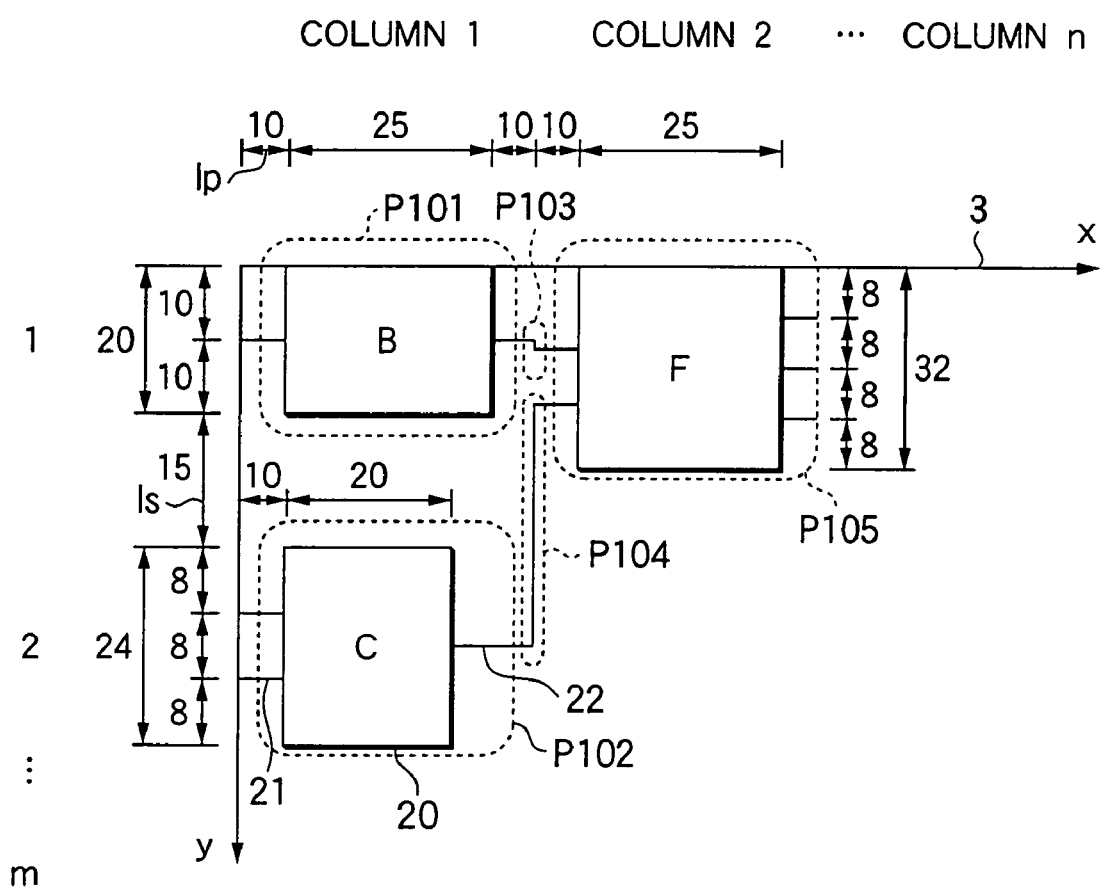
FIG. 6 shows an example of preview display of the programming tool according to the invention.

FIG. 6 is a drawing to show the preview display section 3 used in the description, and FIG. 7 is a drawing to show the 10 preview drawing information storage section 5a updated by the preview coordinate determination means 4a when the user selects FBs 20 in the example in FIG. 6.

In the embodiment, idea of virtual columns is applied to the preview display section 3.

To connect FBs 20 in parallel, it is assumed that the FBs 20 belong to the same column; to connect an FB 20 to an FB in one column in series, it is assumed that the FB 20 belongs to the next column.

In FIG. 6, function block B (FB(B)) and FB (C) belong to the first column and FB(F) belongs to the second column. FB(F) is in series connection to FB(B) and FB(C), and FB(C) is in parallel connection to FB(B).

As for the correspondence between the figures on the preview display section 3 and the preview drawing information storage section 5a, in the example in FIGS. 6 and 7, the figures of P101 to P105 in FIG. 6 correspond to the coordinates of T101 to T105 in FIG. 7, respectively.

That is, in the preview drawing information storage section 5a, the drawing coordinates of FBs 20 are stored in odd-numbered columns and connection information is entered in an even-numbered column between the drawing coordinates of the FBs 20 and thus the drawing information of FB column position n on the preview display section 3 is stored in the (2n−1)th column of the preview drawing information storage section 5a.

Assuming that the FBs 20 in the nth column on the preview display section 3 are the first, second, . . . , mth from top to bottom, the drawing coordinates are stored in the first, second, . . . , mth rows under the (2n−1) st column of the preview drawing information storage section 5a.

Next the operation of preview coordinate determination processing ST2 will be discussed in detail with FIG. 5.

When the user selects an FB 20 by click operation of the mouse 7b, at FB rectangular portion processing ST11, the preview drawing information storage section 5a is referenced and the start position of drawing a rectangle of the FB 20 is calculated. Further, the size of the selected FB 20 is looked up in the FB information storage section 5e with the name of the FB 20 as a key, and the coordinates to draw the rectangle of the FB 20 on the preview display section 3 are determined.

Selection of FB 20 will be discussed separately in three ways of selection of first FB 20 (state in which no FBs 20 are selected), parallel connection, and series connection.

To select FB 20 at the first time, a previously selected FB 20 does no exist. Thus, assuming that the input pin 21 and the output pin 22 have predetermined length lp in length, the position shifted in the X-axis direction from the origin point by the length lp of the input pin 21, (lp, 0), becomes the start position of drawing a rectangle.

From the FB information storage section 5e, if the size of the rectangle of the FB (lateral, longitudinal) is (lx1, ly1), the coordinates of the rectangle of FB(B) become (lp, 0), (lp+lx1, 0), (lp, ly1), (lp+lx1, ly1) in FIG. 6.

Assuming that the length of the input pin 21 of FB(B), lp is 10, the size of the rectangle of FB(B) is lateral 25 and longitudinal 20 from the FB information storage section 5e and therefore the coordinates of the rectangle of FB(B) become (10, 0), (35, 0), (10, 20), (35, 20) and the coordinates are stored in the preview information storage section 5a (T101 in FIG. 7).

Next, at input pin portion processing ST12, the coordinates of the input pin 21 are calculated and the result is stored in the preview information storage section 5a.

For example, assuming that the input pins 21 are placed in FB 20 at equal intervals, the relative coordinates of the input pins 21 in the y direction with respect to the upper side of the rectangle of the FB 20 become ly1m1, (2*ly1m1), . . . , (m*ly1m1), where the number of pins is m and the value resulting from dividing ly1 by (m+1) is ly1m1.

As for FB(B) in FIG. 6, the number of the input pins 21 is one and the x coordinate of the left termination of the input pin 21 and the y coordinate of the upper side of the rectangle of B are both 0 from the FB information storage section 5e and therefore the coordinates of the input pin 21 become (0, 10), (10, 10) and the coordinates are stored in the preview information storage section 5a (T101 in FIG. 7).

Further, at output pin portion processing ST13, the coordinates of the output pin 22 are calculated and the result is stored in the preview information-storage section 5a.

For example, assuming that the output pins 22 are also placed in FB 20 at equal intervals like the input pins 21, the relative coordinates of the output pins 22 in the y direction to the upper side of the rectangle of the FB 20 become ly1m1, (2*ly1m1), . . . , (m*ly1m1).

As for FB(B) in FIG. 6, the number of the output pins 22 is one and the x coordinate of the right side of the rectangle of FB(B) is 35 and the y coordinate of the upper side of the rectangle of B is 0 from the FB information storage section 5e and therefore the coordinates of the output pin 22 become (35, 10), (45, 10) and the coordinates are stored in the preview information storage section 5a (T101 in FIG. 7).

Next, parallel connection in the second way will be discussed.

If the user selects an FB 20 simply by mouse click, the selected FB 20 is connected in series; if the user selects an FB 20 by mouse click with a specific key (which will be hereinafter assumed to be Shift key) pressed, the selected FB is connected in parallel.

In the example in FIG. 6, FB(C) is the case.

In this case, at FB rectangular portion processing ST11, the rectangle coordinates are determined as follows: To begin with, it is assumed that the x coordinate of the start position of drawing a rectangle of the FB 20 is the same as the FB in the same column. It is assumed that the y coordinate of the start position is apart from the lower side of the rectangle of the FB 20 selected immediately before the column by a constant distance ls.

In FIG. 6, the x coordinate of the start position of drawing a rectangle of FB(C) is lp, which is the same as that of FB (B), and the y coordinate becomes (y coordinate of lower side of rectangle of FB(B)+ls). The size of the rectangle of FB(C) is longitudinal 24 and lateral 20 from the FB information storage section Se and therefore, assuming that ls is 15, the coordinates of the rectangle of FB (C) become (10, 35), (30, 35), (10, 59), (30, 59) and the coordinates are stored in the preview information storage section 5a (T102 in FIG. 7).

Subsequently, at input pin portion processing ST12, first the x coordinate of the left termination of the input pin 21 is equal to the x coordinate of the left termination of the input pin 21 of the FB rectangle in the same column, and the y coordinate becomes the position where the input pin 21 is placed at equal interval in the FB rectangle as with the case where FB is selected at the first time. In FIG. 6, the x coordinate of the left termination of the input pin 21 of FB(C) is 0, which is the same as the x coordinate of the left termination of the input pin 21 of FB (B).

Since the number of input pins 21 of FB(C) is two from the FB information storage section 5e, the coordinates of the input pins 21 become (0, 43), (10, 43) and (0, 51), (10, 51) and the coordinates are stored in the preview information storage section 5a (T102 in FIG. 7).

Further, at output pin portion processing ST13, the x coordinate of the left termination of the output pin 22 is equal to the x coordinate of the right side of the FB rectangle. The y coordinate of the output pin 22 becomes the position where the output pin 22 is placed at equal interval in the FB rectangle.

Therefore, the length of the output pin 22 is determined by the following calculation:

First, it is assumed that the length of the FB with the maximum lateral size in the column to which the selected FB belongs is lx_max.

The lx_max is stored in the FB maximum size storage section 5f in FIG. 2.

Assuming that the lateral size of the selected FB is lx_cur, when lx_cur is smaller than lx_max, namely, when (lx_cur) <(ly_max) holds, the length of the output pin 22 is lp+ (lx_max−lx_cur).

In the example in FIG. 6, the length of the output pin 22 becomes lp+(lateral size of FB (B)−lateral size of FB (C))=(10+25−20)=15.

Therefore, the x coordinate of the right termination of the output pin 22 becomes (x coordinate of the left termination+ length of line=30+15=45 (see P102 in FIG. 6 and T102 in FIG. 7).

When (lx_cur)>(lx_max) holds, the length of the output pin 22 of the selected FB is lp, and (lx_cur)−(lx_max) is added to the x coordinate of the right termination of the output pin 22 of another FB in the column to which the selected FB belongs and the value of lx_cur is stored in the FB maximum size storage section 5f as lx_max.

As the processing is thus performed, the x coordinates of the right terminations of the output pins 22 of the FBs in one column become equal to each other and when the FB rectangles are drawn on the preview display section 3, the FB rectangles are aligned to the left in every column for making the figures easy to see.

Next, series connection will be discussed.

If the user selects an FB 20 simply by mouse click when one column or more already exist, the selected FB 20 is connected in series.

In the example in FIG. 6, FB(F) is the case.

At FB rectangular portion processing ST11, the x coordinate of the left side of the rectangle of the FB 20 is calculated as (x coordinate of right termination of output pin 22 in a preceding column+length lp of input pin 21) and the y coordinate is calculated as 0.

In FIG. 6, the x coordinate of the start position of drawing a rectangle of FB(F) becomes (x coordinate right termination of output pin 22 of FB(B)+lp)=(45+10)=55. The size of the rectangle of FB(F) is longitudinal 32 and lateral 25 from the FB information storage section 5e and therefore the coordinates of the rectangle of FB (F) become (55, 0), (80, 0), (55, 32), (80, 32) and the coordinates are stored in the preview information storage section 5a (T105 in FIG. 7).

Subsequently, at input pin portion processing ST12, the x coordinate of the left termination of the input pin 21 is equal to the x coordinate of the right termination of the output pin 22 in the preceding column, and the y coordinate is the position where the input pin 21 is placed at equal interval in the rectangle of the FB 20.

In FIG. 6, the x coordinate of the left termination of the input pin 21 of FB(F) becomes the x coordinate of the right termination of the output pin 22 of FB(B), 45.

Since the number of input pins 21 of FB(F) is two from the FB information storage section 5e, the coordinates of the input pins 21 become (45, 10.7), (55, 10.7) and (45, 21.3), (55, 21.3) and the coordinates are stored in the preview information storage section 5a (T105 in FIG. 7).

Then, at output pin portion processing ST13, the x coordinate of the left termination of the output pin 22 is equal to the x coordinate of the right side of the FB 20, and the y coordinate is the position where the output pin 22: is placed at equal interval in the rectangle of the FB 20.

Since the number of output pins 22 of FB(F) is three from the FB information storage section Se, the coordinates of the output pins 22 become (80, 8), (90, 8), (80, 16), (90, 16), and (80, 24), (90, 24) and the coordinates are stored in the preview information storage section 5a (T105 in FIG. 7).

The drawing information provided by performing the drawing processing described above is stored in the preview drawing information storage section 5a in the storage section 5, and P101, P102, and P105 in FIG. 6 correspond to T101, T102, and T105 in FIG. 7.

That is, the order from the top of the FBs on the preview display section 3 in FIG. 6 correspond to the rows of the drawing information in FIG. 7. Regarding the columns, however, connection information is entered between the drawing information pieces of the FBs in FIG. 7 and thus in the preview drawing information storage section 5a, the odd-numbered columns represent the drawing information of the FBs and the drawing coordinates of FB in the nth column are stored in the (2n−1)th column of the preview drawing information storage section 5a and the connection coordinates between the FB 20 in the nth column and the FB 20 in the (n+1)th column are stored in the (2n)th column of the preview drawing information storage section 5a.

As shown in FIG. 7, the FB drawing information in the preview drawing information storage section 5a includes block name, block coordinates, input pin coordinates, and output pin coordinates; the output pin coordinates are provided with a connection flag in addition to the pin coordinates.

The value of the connection flag is "0" (unconnected) or "1" (connected).

This is used in automatic connection processing shown below.

FB in the nth column connected in series is selected and upon completion of the drawing information storage processing in the (2n−1)th column of the preview drawing information storage section 5a and the drawing processing on the preview display section 3 at FB drawing processings ST11 to ST13 described above, connection portion processing ST 14 is performed.

Next, connection portion processing ST 14 will be discussed with a flowchart of FIG. 8 and FIG. 9.

Figure 9:
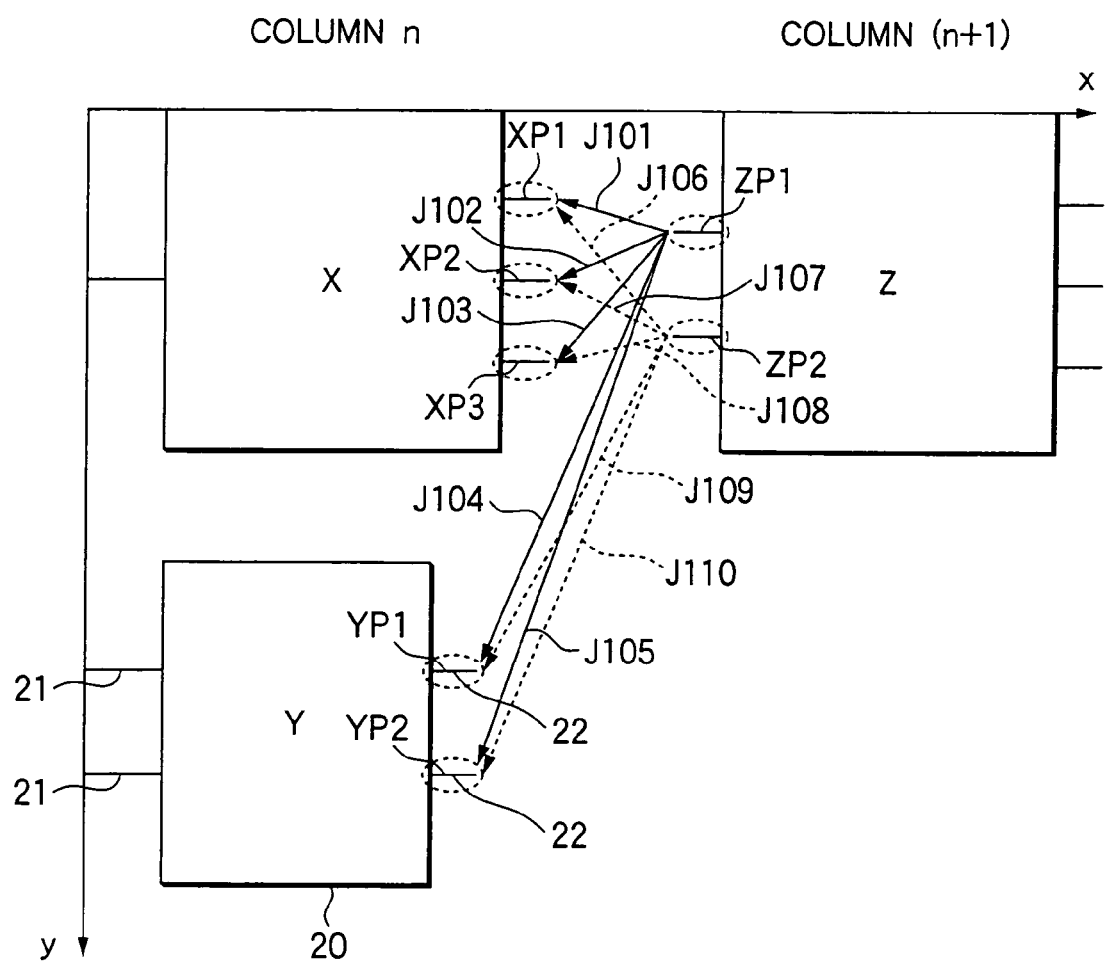
FIG. 9 is a drawing to show the pin processing order in the automatic connection processing of the programming tool according to the invention.

FIG. 9 is a drawing to show an example wherein function block Z (with two input pins) is selected so as to be connected in series in a state where function block X (with three output pins) and function block Y (with two output pins) are previously selected and are at positions for parallel connection.

The connection processing at connection portion processing ST 14 is applied to the input pins 21 of the selected FB 20 and the output pins 22 of the previously selected FBs 20, namely, applied to the input pins 21 of FB(Z) and the output pins 22 of FB(X) and FB(Y) in the example in FIG. 9.

The number of combinations of the input pins 21 and the output pins 22 to which the connection processing is applied is (number of input pins 21×number of output pins 21).

In the example in FIG. 9, the number of the input pins 21 is (number of input pins of FB(Z))=2 and the number of the output pins 22 is (number of output pins of FB(X), 3, +number of output pins of FB (Y), 2)=5 and therefore the number of combinations of the input pins 21 and the output pins 22 to which the connection processing is applied is 2×5=10.

Connection portion processing ST 14 described later is executed for each combination of input pin 21 and output pin 22. The order of the combinations of the input pins 21 and the output pins 22 to which the connection processing is applied is determined as follows:

First, the input pin 21 to which the connection processing is applied is the first input pin 21 of FB(Z) (ZP1 in the figure) and the output pin 22 to which the connection processing is applied is the first output pin 22 of X in the first row (XP1).

Upon completion of connection portion processing ST 14 for ZP1 and XP1 (J101 in the figure), then the output pin 22 to which the input pin 21 (ZP1 in the figure) is applied is changed to the second output pin XP2 of X (J102) and the next target is XP3 (J103).

Upon completion of processing for FB(X), processing of the output pins 22 is applied to FB(Y), and connection processing ST204 (J104, J105) is performed between ZP1 and the output pin 22 (YP1, YP2).

Upon completion of processing of the first input pin 21 of FB(Z) (ZP1) to all output pins 22, the input pin 21 to which the connection processing is applied is changed to the second input pin 21 of Z (ZP2).

As with ZP1, processing is performed for XP1, XP2, XP3, YP1, and YP2. (J106 to J110).

Next, the operation of connection portion processing ST 14 will be discussed with the flowchart of FIG. 8. At ST21 in FIG. 8, the data type of the input pin 21 to which the processing is applied (for example, ZP1 in FIG. 9) is read from the FB information storage section Se with the block name as a key.

At ST22, the data type of the output pin 22 is read from the FB information storage section 5e with the block name of the FB 20 to which the processing is applied (for example, FB(X) in FIG. 9) as a key.

The connection flag of the output pin 22 of the FB 20 to which the processing is applied is read from the preview drawing information storage section 5a.

At ST23, if the value of the read connection flag of the output pin 22 is 1 (meaning that the output pin 22 has already been connected to another input pin 21), the processing for the input pin 21 and the output pin 22 of the current processing targets is terminated; if the value of the connection flag is (meaning that the output pin 22 is unconnected to another input pin 21), the processing is continued.

At ST24, the data type of the input pin 21 obtained at ST21 is compared with the data type of the output pin 22 obtained at ST22. If the data types match, the input pin 21 and the output pin can be connected and thus are connected at the following pin-to-pin line coordinate determination processing ST25:

At pin-to-pin line coordinate determination processing ST25, the coordinates of the line connecting the coordinates of the right termination of the output pin 22 in the nth column and the coordinates of the left termination of the input pin 21 in the (n+1)th column are stored in the (2n)th column of the preview drawing information storage section 5*a*.

Then, at connection flag update processing ST26, the connection flag, in the drawing information, of the output pin 22 connected is updated from 0 to 1 (representing connected).

In the example in FIG. 6, the first pins to which the connection processing is applied are the first input pin 21 of FB(F) (FP1) and the output pin 22 of FB(B).

The data type of FP1 is found from the FB information storage section 5*e* with the block name "F" as a key, and "integer" is found.

Likewise, the data type of the output pin 22 of FB(B) is also "integer."

Since the output pin 22 of FB(B) is not connected at the point in time when FB (F) is selected, the value of the connection flag of the output pin 22 of the function block B in the preview drawing information storage section 5*a* is 0. The data types match and the value of the connection flag is 0 and thus the conditions at ST23 and ST24 in FIG. 8 are satisfied.

Therefore, according to pin-to-pin line coordinate determination processing ST25, the connection coordinates are calculated and are stored in the first row, second column of the preview drawing information storage section 5*a*. (T103 in FIG. 7).

Figure 8:
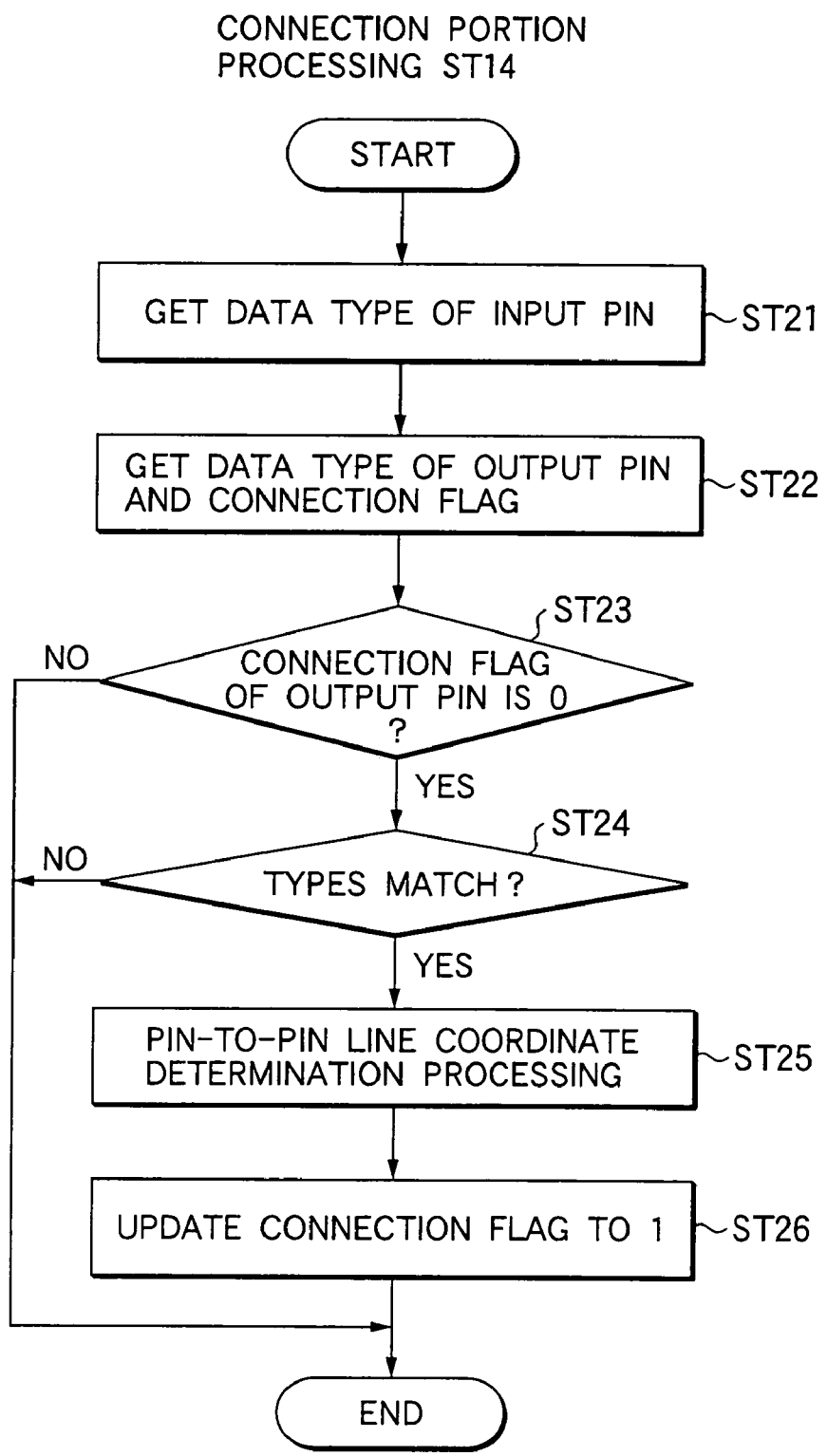
FIG. 8 is a flowchart to show the operation of automatic connection processing of the programming tool according to the invention.

Next, the input pin 21 to which the connection processing is applied is the second input pin 21 of FB(F) (FP2) and the data type of the input pin is found as "date and time" at ST21 in FIG. 8.

The output pin 22 to which the connection processing is applied is the output pin 22 of B. However, the output pin 22 of B has already been connected to the first input pin 21 of F by the above-described processing and the connection flag has-been updated to and the condition at ST23 is not satisfied.

The next output pin 22 to which the connection processing: is applied is the output pin 22 of C. The data type is "date" from the FB information storage section 5*e* and the condition at ST23 is satisfied.

Further, the pin is not connected and thus the connection flag is 0 and the condition at ST24 is satisfied.

Therefore, according to pin-to-pin line coordinate determination processing ST25, the line coordinates are stored in the second row, second column of the preview drawing information storage section 5*a*. (T104 in FIG. 7).

Next, next candidate function block determination processing ST3 by the next candidate function block determination means 4*b* will be discussed with FIGS. 10 to 12.

Figure 10:
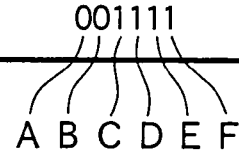
FIG. 10 is a drawing to show a state in which bit strings each representing the function blocks as the next candidates are stored in a next candidate function block storage section of the programming tool according to the invention.

FIG. 10 shows the next candidate function block information storage section 5*b* storing information of the FBs 20 as the next selection candidates when one FB 20 is selected, previously defined from the data types and functions of the output pins 22 of the FBs 20 and provided by the manufacturer providing the programming tool.

The bits of the bit string in FIG. 10 correspond to A, B, . . . , F from the most significant bit to the least significant bit; the bit value "1" means "next candidate FB" and "0" means "not next candidate FB."

Figure 11:
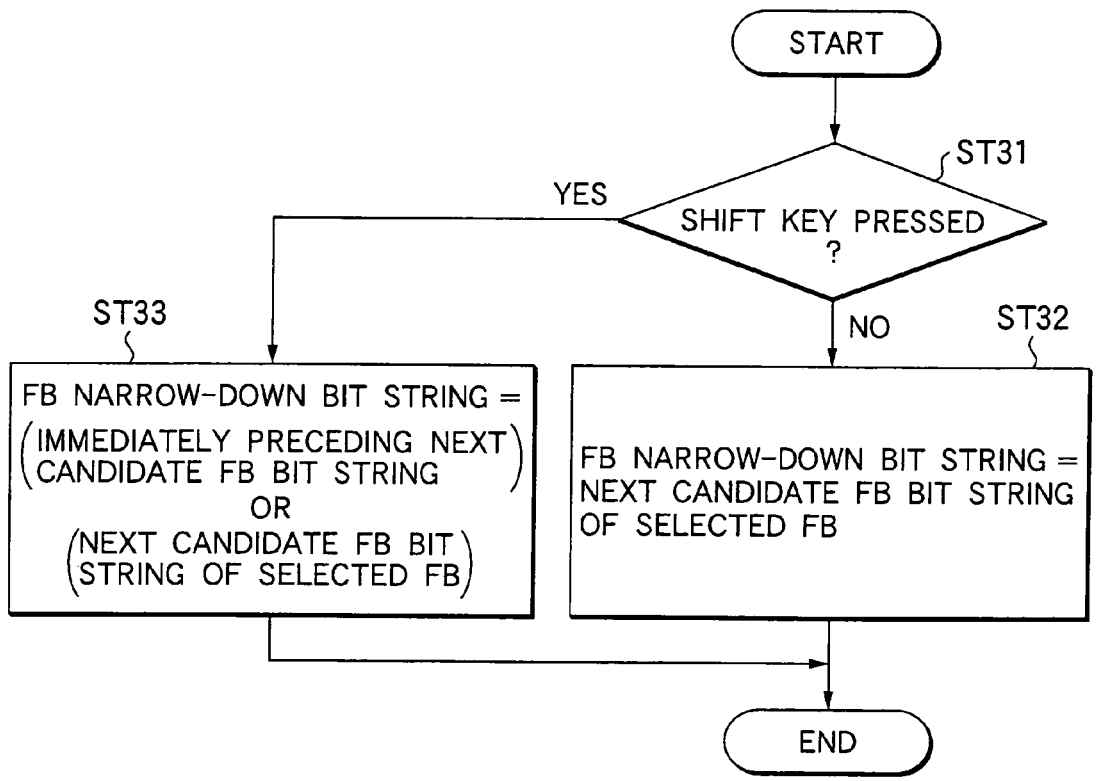
FIG. 11 is a flowchart to show the operation of function block candidate narrowing down processing of the programming tool according to the invention.
Figure 12:
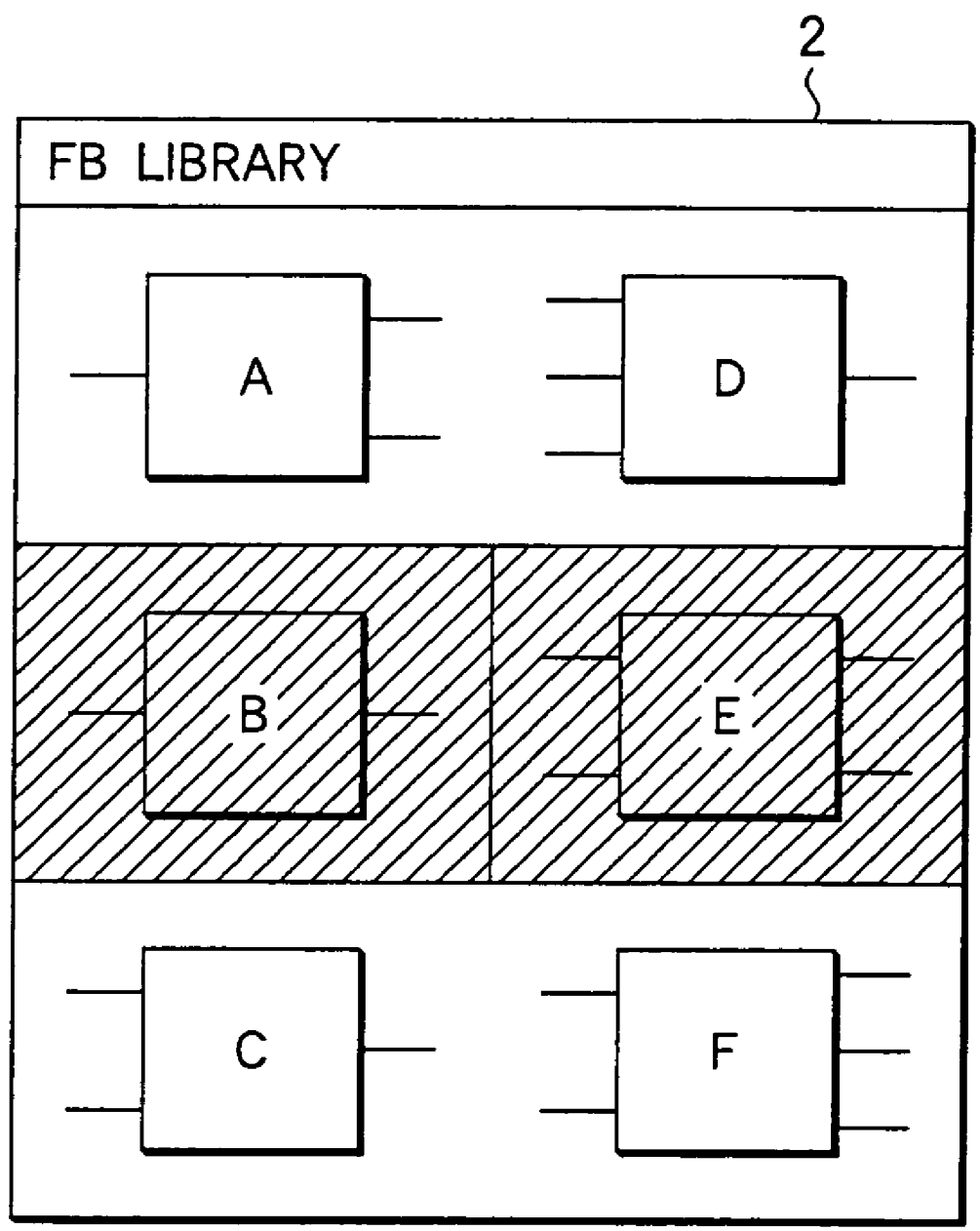
FIG. 12 shows a drawing example of an FB library by executing the function block candidate narrowing down processing of the programming tool according to the invention.

FIG. 11 is a flowchart to represent the operation of next candidate function block determination processing ST3.

At ST31, whether or not the user selects an FB20 by mouse click with the Shift key pressed at user operation ST1 is determined. If the user selects an FB 20 without pressing the Shift key, ST32 is executed; if the user selects an FB 20 with the Shift key pressed, ST33 is executed.

ST32 is executed if the user selects an FB 20 without pressing the Shift key. In this case, the selected FB 20 (FB1) is connected in series.

Assuming that the FB1 is to be placed in the nth column, only the FB1 is placed in the nth column.

The bit string representing the FBs 20 as the next candidates acquired from the next candidate function block information storage section 5*b* with the FB name of FB1 as a key becomes next candidate FB bit string connected in series to the FB1 and is stored in the next candidate FB bit string storage section 5*d*.

ST33 is executed if the user selects an FB 20 with the Shift key pressed. In this case, the selected FB (FB_3) is connected in parallel.

Assuming that an FB (FB_2) already already exists in the nth column in which the FB_3 is to be placed, the next candidate FB next connected in series becomes the logical sum of the bit string acquired with FB_2 as a key from the next candidate function block information storage section 5*b* and the bit string acquired with FB_3 as a key (bit string Bit1).

Further, if the user selects another FB 20 (FB_4) by mouse click with the Shift key pressed, the FB_2, the FB_3, and the FB_4 are connected in parallel in the column.

In this case, the next candidate FB bit string next connected in series becomes the logical sum of the bit strings acquired with the block names of FB_2, FB_3, and FB_4 as keys from the next candidate function block information storage section 5*b*, namely, the logical sum of the bit strings acquired with the Bit1 and FB_4 as keys.

Thus, if the user selects an FB 20 with the Shift key pressed, the next candidate FB bit string becomes the logical sum of the immediately preceding next candidate FB bit string and the next candidate FB bit string of the selected FB, and the value is stored in the next candidate FB bit string storage section 5*d*.

At preview display section drawing processing ST4, the selected FB 20 is drawn on the preview display section 3 based on the coordinate information determined by executing the preview coordinate determination processing ST2 described above and stored in the preview drawing information storage section 5*a*.

At FB library section drawing processing ST5, drawing (redrawing) of the FB library section 2 is performed using the next candidate FB bit string in the next candidate FB bit string storage section 5*d*.

In the redrawing, the background of the FB 20 with the value "0" of the corresponding bit in the next candidate FB bit string is grayed or shaded for drawing, and the background of the FB 20 with the value "1" of the corresponding bit is drawn in white.

For example, if FB(C) is selected out of the FB library section 2 in FIG. 1 and then FB(D) is selected by mouse click with the Shift key pressed, first, as FB(C) is selected, the next candidate FB bit string becomes "100001" from the next candidate FB information storage section 5*b* (see FIG. 10).

The next candidate FB bit string as FB(D) is selected with the Shift key pressed is "001100" from the next candidate FB information storage section 5*b* and therefore the next candidate FB bit string becomes the logical sum of the bit strings "101101."

Therefore, in redrawing of the FB library section 2 by executing the FB library section drawing processing ST5, the backgrounds of FB (A), FB(C), FB(D), and FB(F) are drawn in white, and the backgrounds of FB (B) and FB(E) are drawn in gray. (See FIG. 12).

That is, when an FB is selected, the FBs that can be next selected are narrowed down and the FBs that cannot be next selected are displayed in a different color (in the embodiment, grayed, shaded, etc.,), so that the user can easily select the next FB, mistakes of erroneous wiring are eliminated, and the programming efficiency is enhanced.

Next, processing performed when the user presses the Delete key at user operation ST1 (ST6, ST7, ST4, and ST5) will be discussed.

At preview drawing information clear processing ST6, the information in the preview drawing information storage section 5a is all cleared (deleted).

Further, as next candidate FB bit string clear processing ST7 is executed, the next candidate FB bit string in the next candidate FB bit string storage section 5d is cleared (all zeros).

Next, redrawing of the preview display section 3 is performed at the preview display section drawing processing ST4 described above based on the preview drawing information storage section 5a cleared at ST6. However, since no information is stored in the preview drawing information storage section 5a, nothing is drawn in the preview display section 3.

Redrawing of the FB library section 2 is performed based on the bit string in the next candidate FB bit string storage section 5d cleared at ST7. Since the next candidate FB bit string in the next candidate FB bit string storage section 5d is "000000," the backgrounds of all FBs 20 are drawn in white.

As the processing is performed as described above, both the preview display section 3 and the FB library section 2 are placed in the display state in which the user does not select any FBs 20.

Next, processing performed when the user drags and drops any desired FB 20 into the FBD editor from the FB library section 2 in FIG. 1 at user operation ST1 will be discussed.

Figure 3:
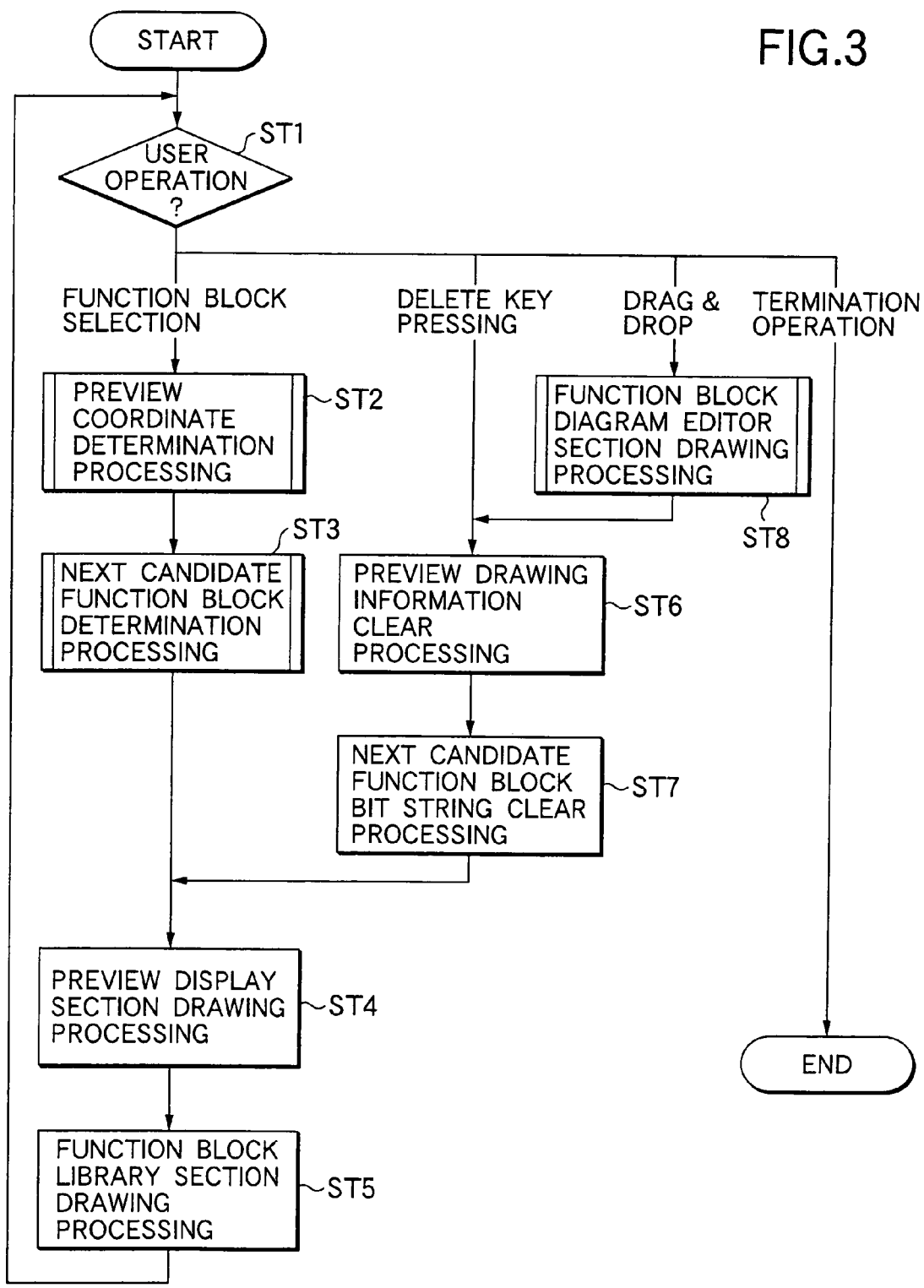
FIG. 3 is a flowchart to show the operation of the programming tool according to the invention.

As shown in FIG. 3, in this case, at FBD editor section drawing processing ST8, the FBD editor section drawing means 4c is executed and the diagram drawn on the preview display section 3 is drawn in the FBD editor section 1 at ST2, etc., and then both the preview display section 3 and the FB library section 2 are placed in the display state in which the user does not select any FBs as processing similar to that performed when the Delete key is pressed at user operation ST1 described above is performed.

Figure 13:
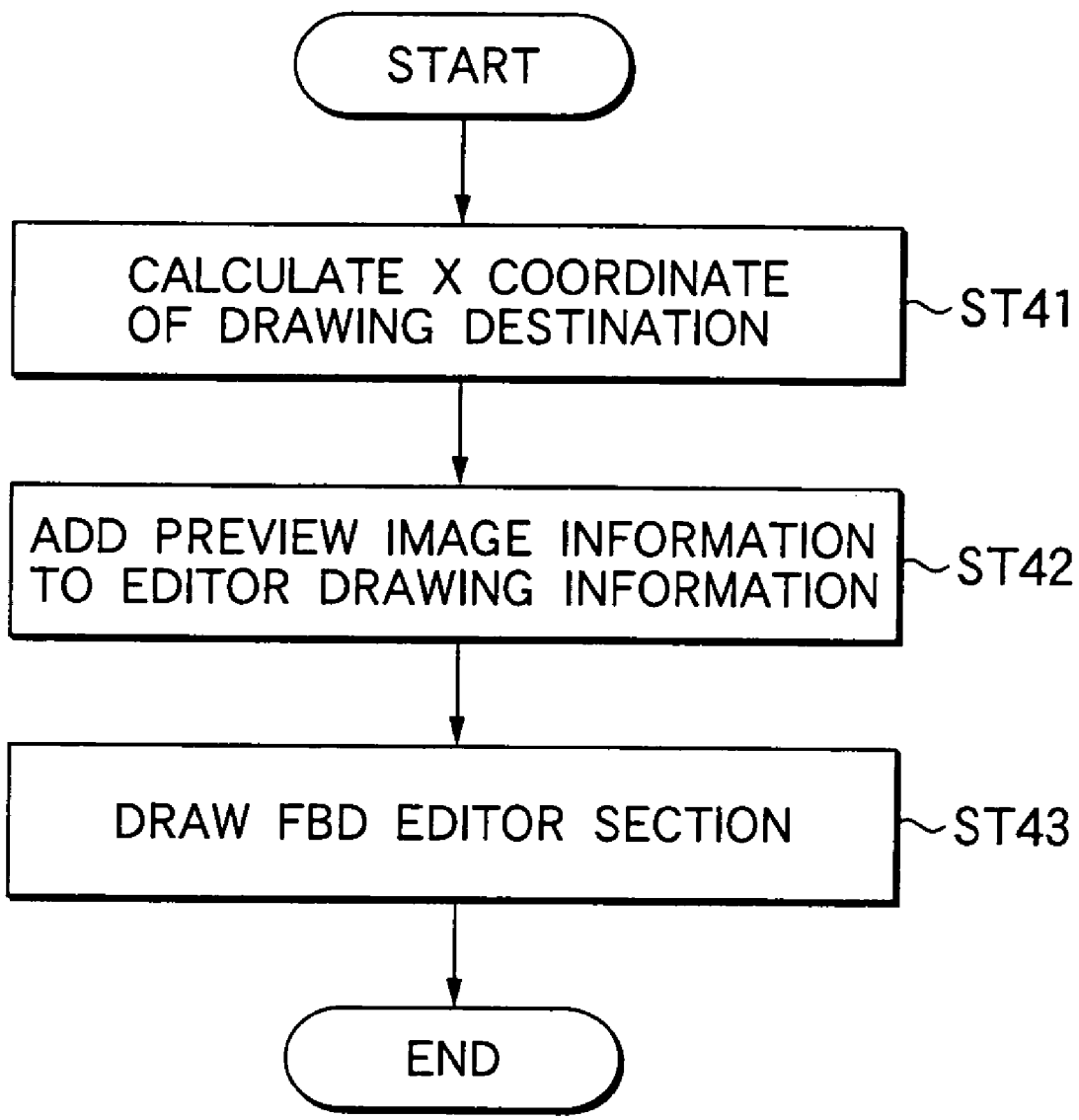
FIG. 13 is a flowchart to show the operation of editor drawing processing of the programming tool according to the invention.

The FBD editor section drawing processing ST8 will be discussed in details with a flowchart of FIG. 13 and FIGS. 14 and 15.

For the drawing information of the FBD editor section 1, the drawing coordinates for each of FBs and connection lines (collectively called objects) are stored in the FBD editor drawing information storage section 5c in FIG. 15.

At ST41, the x coordinate of the rightmost end of FB 20 already drawn in the FBD editor section 1, namely, the maximum value of the x coordinate (x_max) in the FBD editor drawing information storage section 5c is found. (See x_max in FIGS. 14 and 15).

At ST42, the preview drawing information retained in the preview drawing information storage section 5a is stored in the FBD editor drawing information storage section 5c for each object; x_max is added to the value of the x coordinate in the preview drawing information storage section 5a for storage so that the diagram already drawn in the FBD editor section 1 and the diagram in the preview drawing information storage section 5a do not overlap.

At ST43, the FBD editor section 1 is redrawn based on the data updated in the FBD editor drawing information storage section 5c.

Figure 14:
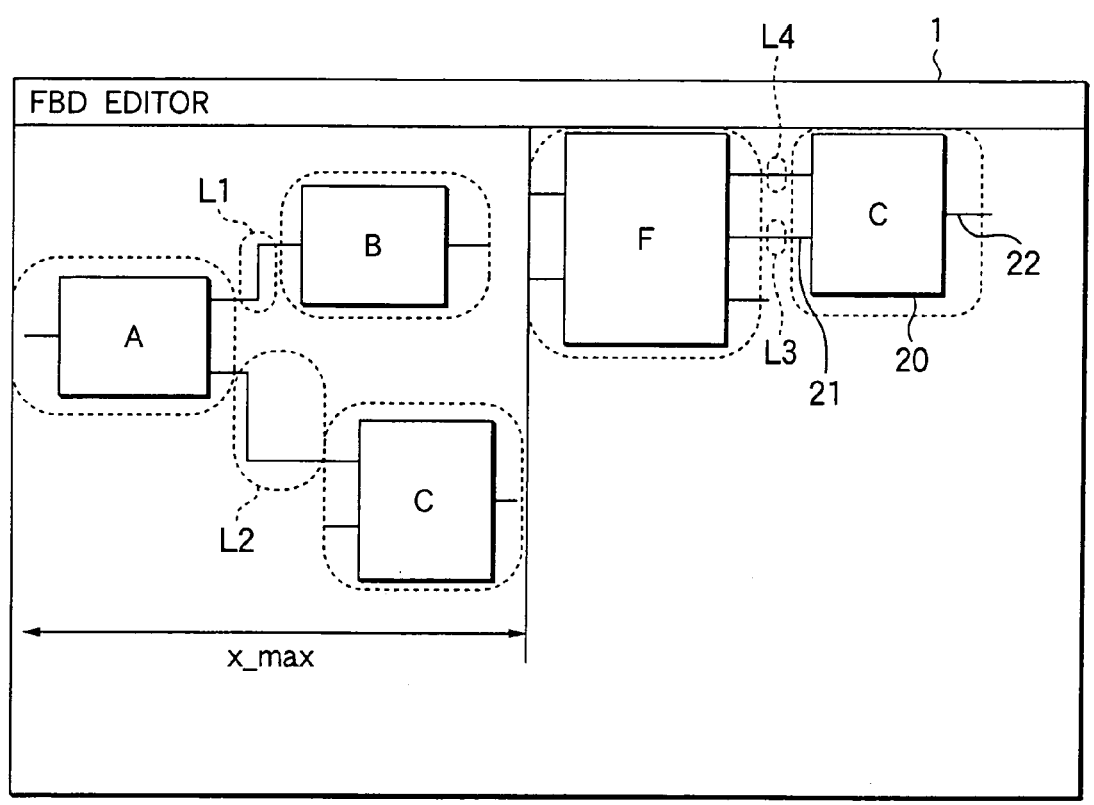
FIG. 14 shows a drawing example of an FBD editor section by executing editor drawing processing of the programming tool according to the invention.
Figure 16:
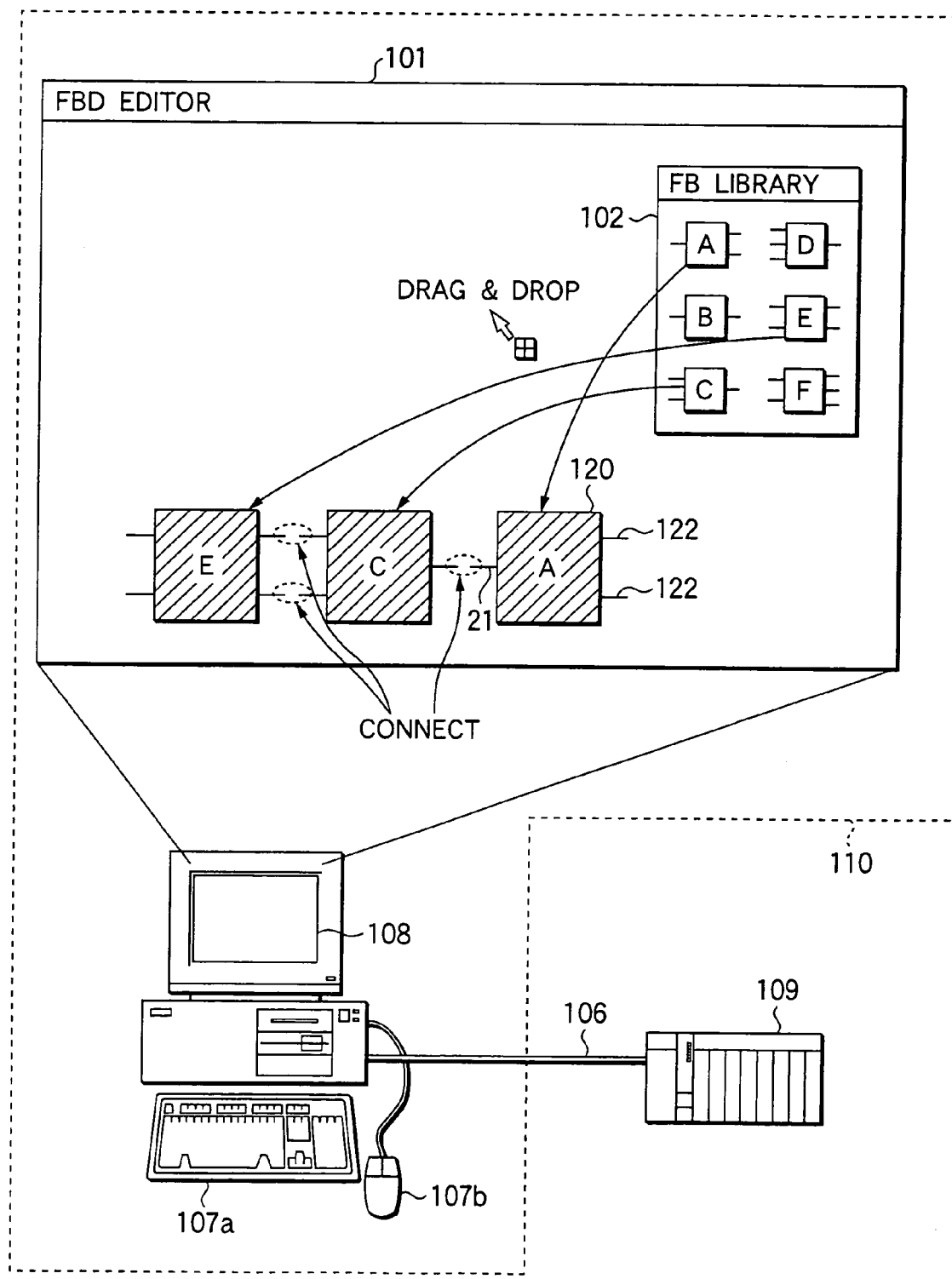
FIG. 16 is a drawing to show the operation of a programming tool in a related art.

FIG. 14 is a drawing to show an example of the editor drawing processing ST8 in which FB(F) and FB(C) are selected out of the FB library section 2 simply by mouse click and are dragged and dropped into the FBD editor section 1 with FB (A), FB(B), and FB(C) already drawn.

At ST41, x_max is found. In the example, the x coordinate of the right termination of the output pin 22 of FB(C), "100," becomes x_max.

At ST42, as shown in FIG. 15, the value "100" of x_max is added to each of the values of the x coordinates of FB20 and connection lines in the preview drawing information storage section 5a for storage in the FBD editor drawing information storage section 5c for each object.

At ST43, the FBD editor section 1 is redrawn based on the FBD editor drawing information storage section 5c updated. By the way, use of the invention for the programming tool with FBD has been described, but the invention can also be used for other programming tools, needless to say.

According to the embodiment, a program with FBD can be prepared by easy operation.

Since the means for displaying the drawing image at the drag-and-drop time on the preview window at the FB selection time is provided, the programming state can be seen at a glance.

Since the means for aligning the FBs in on column to the left is provided, easy-to-see display is produced.

When an FB is selected, the FBs that can be next selected are narrowed down and are displayed in a different manner, so that the user can easily select the next FB and a selection mistake can be prevented.

Further, the means for enabling parallel connection in a combination with a specific key at the FB selection time is provided, so that not only simple programming of series connection, but also complicated programming combined with parallel connection can be conducted.

INDUSTRIAL APPLICABILITY

As described above, the programming tool according to the invention is suited for use in programming with a function block diagram of a programmable controller.

The invention claimed is:
1. A programming tool comprising:
   a selection section for selecting a plurality of function blocks displayed in a library format;
   a coordinate calculation section for:
      calculating coordinates of positions of the plurality of selected function blocks based on the order of the function blocks as selected,
      calculating coordinates of positions of an input pin and an output pin based on attribute information of the selected function block,
      determining based on attribute information of the selected block and the previously selected blocks whether the functions blocks can be connected to each other,
      calculating coordinates of positions of a line connecting the input pin and the output pin of the function blocks when the functions blocks can be connected to each other, wherein the coordinate calculation section does not require a user to specify the position of the selected function blocks or pin connection information;

a coordinate storage section for storing the calculated coordinates of the function blocks, the input pin and the output pin of the function blocks and the line connecting the input pin and the output pin of the function blocks, and a drawing section for drawing and displaying a state in which the selected function blocks are connected, based on the coordinates stored in the coordinates storage section.

2. The programming tool according to claim 1, comprising a preview section for producing preview display of the selected function blocks at the function block selection time.

3. The programming tool according to claim 2, wherein when the preview display is produced, a virtual column for displaying the function blocks is provided, a predetermined maximum and actual values of lateral sizes of the function blocks displayed in the column are used to calculate lengths of output pins of the function blocks, and the function blocks in the column are aligned to the left.

4. The programming tool according to claim 1, wherein when a function block is selected, the function blocks as next candidates to the selected function block are narrowed down and the function blocks as the next candidates are displayed in a different manner.

5. The programming tool according to claim 1, wherein, when a function block is selected, the function block is connected in parallel while predetermined key operation is performed in combination.

6. The programming tool according to claim 1, wherein the attribute information of the function blocks is entered before the block is selected.

7. The programming tool according to claim 1, wherein the coordinate calculation section calculates coordinates of the input and output pins of a selected function block, and the lines connecting appropriate function blocks before the selected function block is displayed to the user.

8. A method for programming with a function block diagram, including the steps of:
    selecting a plurality of function blocks displayed in a library format;
    calculating coordinates of positions of the plurality of selected function blocks based on the order of the function blocks as selected;
    calculating coordinates of positions of an input pin and an output pin based on attribute information of the selected function block,
    determining based on attribute information of the selected block and the previously selected blocks whether the functions blocks can be connected to each other,
    calculating coordinates of positions of a line connecting the input pin and the output pin of the function blocks when the functions blocks can be connected to each other;
    storing the calculated coordinates of the function blocks, the input pin and the output pin of the function blocks and the line connecting the input pin and the output pin of the function blocks; and
    drawing and displaying a state in which the selected function blocks are connected, based on the stored coordinates, wherein a user is not required to specify the position of the selected function blocks or pin connection information to connect the input and output pins function blocks.

9. The method for programming with a function block diagram of claim 8, fun her including a step of, prohibiting the selection of a function block based on attribute information of the previously selected function block.

10. The method for programming with a function block diagram of claim 8, wherein the coordinates of the input and output pins of the function blocks, and the lines connecting the appropriate function blocks, are calculated before the function blocks are displayed to the user.

* * * * *